US010951757B1

(12) United States Patent
Shubin et al.

(10) Patent No.: US 10,951,757 B1
(45) Date of Patent: Mar. 16, 2021

(54) SYSTEMS AND METHODS FOR SHIFTING CALL HANDLING ACROSS MULTI-REGION SERVICE CLUSTERS

(71) Applicant: RingCentral, Inc., Belmont, CA (US)

(72) Inventors: James Shubin, San Francisco, CA (US); Benjamin Leznik, Los Gatos, CA (US)

(73) Assignee: RINGCENTRAL, INC., Belmont, CA (US)

( * ) Notice: Subject to any disclaimer, the term of this patent is extended or adjusted under 35 U.S.C. 154(b) by 0 days.

(21) Appl. No.: 16/915,811

(22) Filed: Jun. 29, 2020

(51) Int. Cl.
| | |
|---|---|
| H04M 15/00 | (2006.01) |
| H04M 3/436 | (2006.01) |
| H04M 3/56 | (2006.01) |
| H04M 3/523 | (2006.01) |
| H04M 3/42 | (2006.01) |
| H04L 29/06 | (2006.01) |
| H04W 24/02 | (2009.01) |
| H04N 7/14 | (2006.01) |

(52) U.S. Cl.
CPC ............ *H04M 3/436* (2013.01); *H04L 65/80* (2013.01); *H04M 3/42068* (2013.01); *H04M 3/5233* (2013.01); *H04M 3/5235* (2013.01); *H04M 3/567* (2013.01); *H04M 15/88* (2013.01); *H04N 7/147* (2013.01); *H04W 24/02* (2013.01)

(58) Field of Classification Search
None
See application file for complete search history.

(56) References Cited

U.S. PATENT DOCUMENTS

| | | | | |
|---|---|---|---|---|
| 5,590,188 A | * | 12/1996 | Crockett | H04M 3/5237 379/225 |
| 6,333,979 B1 | * | 12/2001 | Bondi | H04M 3/5237 379/219 |
| 7,200,216 B2 | * | 4/2007 | Sherratt | H04M 3/523 379/220.01 |
| 10,135,989 B1 | | 11/2018 | Indyk et al. | |
| 10,142,473 B1 | * | 11/2018 | Chishti | G06Q 10/06393 |
| 10,498,897 B1 | * | 12/2019 | Chadha | H04M 3/5234 |
| 10,718,031 B1 | * | 7/2020 | Wu | A61P 43/00 |

OTHER PUBLICATIONS

"How to build a multi-region active-active architecture on AWS," the article is retrieved from https://read.acloud.guru/why-and-how-do-we-build-a-multi-region-active-active-architecture-6d81acb7d208.

* cited by examiner

*Primary Examiner* — Quoc D Tran
(74) *Attorney, Agent, or Firm* — Finnegan, Henderson, Farabow, Garrett & Dunner LLP

(57) ABSTRACT

A system for handling calls in a network includes a memory storing instructions and a processor configured to execute the instructions to perform operations. The operations include receiving information about the calls for a time interval, determining, for the time interval, a total cost associated with handling the calls, including a network cost associated with transmitting data over the network, a processing cost for processing the information related to the calls, and a cost of dynamically reassigning master and slave roles to a plurality of nodes in the network. The operations further include determining an assignment of the master and slave roles for a plurality of accounts being handled by the plurality of nodes that results in the total cost having a minimum value, and implementing the optimal assignment among the plurality of the accounts based on the determination.

20 Claims, 11 Drawing Sheets

US 10,951,757 B1

SYSTEMS AND METHODS FOR SHIFTING CALL HANDLING ACROSS MULTI-REGION SERVICE CLUSTERS

TECHNICAL FIELD

The present disclosure generally relates to systems and methods for shifting call handling across multi-region service clusters, and more particularly, to dynamically assigning call tasks to unassigned master and slave nodes across multi-region service clusters based on real-time load values.

BACKGROUND

Distributed computing relies upon a system of hardware and software to control the distribution of tasks and orchestrate the flow of data between numerous servers connected via a network. Typically, controlling the flow of data includes minimizing costs associated with data transmission and data processing. Further, minimizing costs may be subject to constraints associated with requiring the distributed computing system to be resistant to network and device failures. An example of such a distributed computing system may be a call handling system having multiple call-processing centers with users located in different regions, such as the east and west coasts of the United States. Using a device, such as a smartphone, a user may access the call handling system in a region different from where the user resides, and decisions to assign call agents may be made at different locations, resulting in an inefficient, decentralized assignment of call tasks, such as the assignment to a call agent in this example.

In view of the shortcomings and problems with traditional distributed computing systems, improved systems and methods for minimizing costs related to call handling across multi-region call-processing centers are desired.

SUMMARY

Consistent with a disclosed embodiment, a system for handling calls in a network is provided. The system includes a memory storing instructions and a processor configured to execute the instructions to perform operations. The operations include receiving information about the calls for a time interval, determining, for the time interval, a total cost associated with handling the calls, including a network cost associated with transmitting data over the network, a processing cost for processing the information related to the calls, and a cost of dynamically reassigning master and slave roles to a plurality of nodes in the network. The operations further include determining an assignment of the master and slave roles for a plurality of accounts being handled by the plurality of nodes that results in the total cost having a minimum value, and implementing the optimal assignment among the plurality of the accounts based on the determination.

Consistent with another embodiment, a method for handling calls in a network is provided. The method includes receiving information about calls for a time interval, and determining, for the time interval, a total cost associated with handling the calls allocated to nodes for processing the calls, including a network cost associated with transmitting data over the network, a processing cost for processing information related to the calls, and a cost of dynamically reassigning master and slave roles to a plurality of nodes in the network. The method may further include determining an optimal assignment of the master and slave roles for the plurality of accounts being handled by nodes that results in the total cost having a minimum value, and implementing the optimal assignment among the plurality of accounts based on the determination.

Consistent with another embodiment, a method for handling calls by a slave node for an account and a master node for the account is provided. The method includes receiving a first call from a user by the slave node, processing the first call using the slave node by obtaining information for the first call, and submitting the first call information to a cost balancer. The method may further include submitting the first call information to the master node, receiving the first call by the master node, and assigning an agent to the first call.

The foregoing general description and the following detailed description are exemplary and explanatory only and are not restrictive of the claims.

BRIEF DESCRIPTION OF THE DRAWINGS

The accompanying drawings, which are incorporated in and constitute a part of this specification, illustrate several embodiments and, together with the description, serve to explain the disclosed principles. In the drawings.

DESCRIPTION OF THE EMBODIMENTS

Reference will now be made in detail to illustrative embodiments, examples of which are illustrated in the accompanying drawings and disclosed herein. Wherever convenient, the same reference numbers will be used throughout the drawings to refer to the same or like parts.

Consistent with disclosed embodiments, a system for handling calls (also herein referred to as a call handling system) and assigning agents to the calls is provided. As used herein, the term "call" is used as a generic term for any type of data communication received from a user or from an external system. For example, a call may be an audio phone call, a text message, a video call, a binary data stream, a data submitted in the form of a file, a sound signal, an electromagnetic signal, or any other type of signal capable of transmitting the information. One of the tasks of the call handling system may include receiving a call from a user, determining information about the user from the data obtained from the call (e.g., the information about the user may include a name of the user, an identification associated with the user, an account of the user, a phone number of the user, a location of the user, a location at which a call is being placed, the urgency of the call, an allowable delay that may be tolerated by the user, a network used by the user to place the call, or any other user-related information), and determining an appropriate agent that should be handling the user call. The agent may be, for example, an operator or a computer-executed process.

Additionally, a computer-executed process of the call handling system may provide an interface for the user to provide information for the system to process. The interface may include an automated menu for selecting different options, a webpage containing a form for inputting any type of data (e.g., text, audio, image, or video data). Any other suitable interface may be employed (e.g., an interface allowing receiving data via FTP transmission, fax transmission, email, Internet-based whiteboard, and the like). In an example embodiment, the call handling system may be configured to handle calls from multiple users that may be located at different geographical locations. The users may include individuals, organizations, computer applications, user groups, data collecting/generating bots (i.e., computer applications for generating and collecting data), hardware devices configured to place calls with the call handling system, or any other entities capable of communicating with the call handling system.

Figure 1:
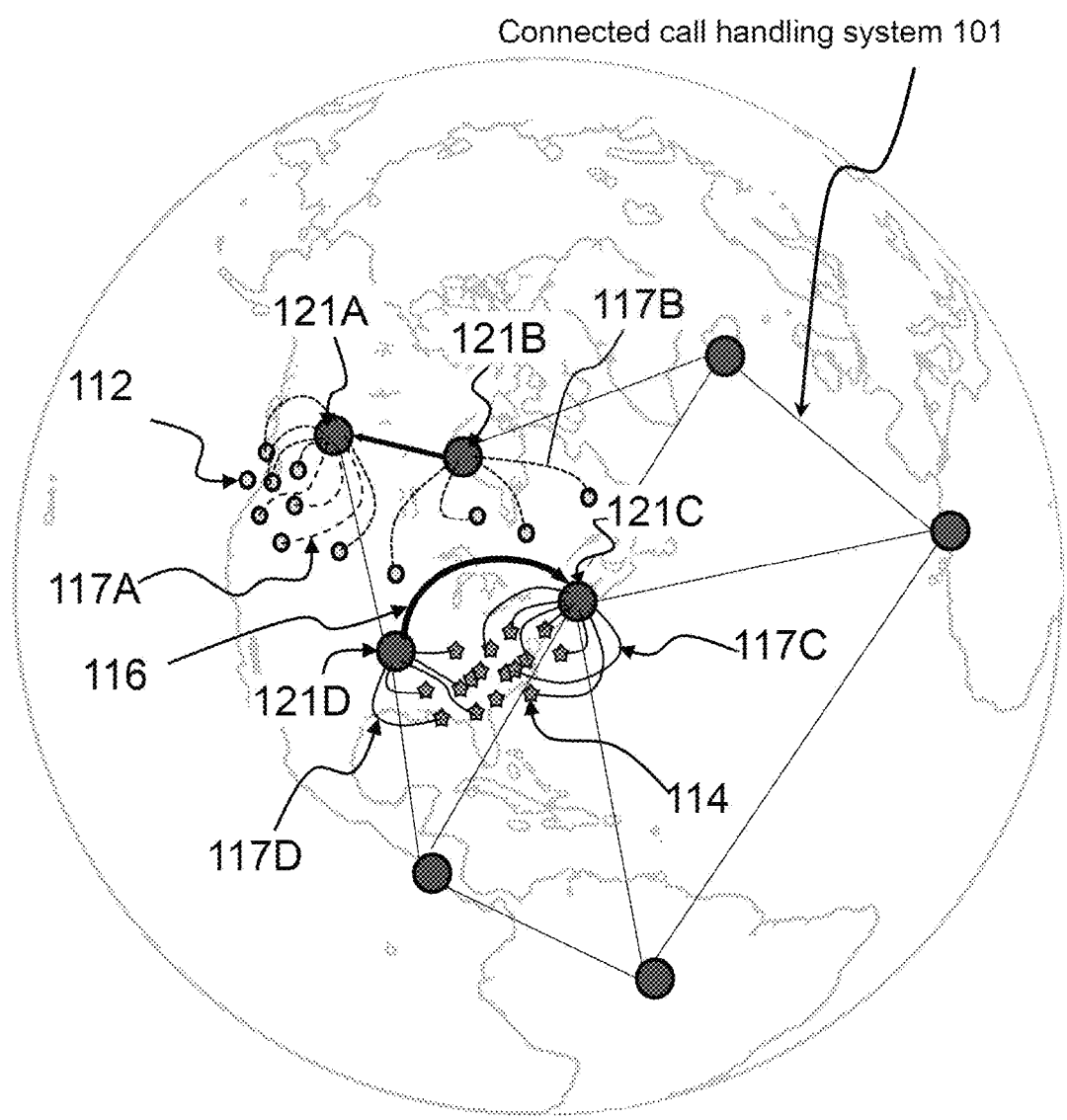
FIG. 1 is a diagram of an example system for call handling, consistent with disclosed embodiments.

Consistent with disclosed embodiments, a call handling system 101 is shown in FIG. 1. System 101 may include multiple connected nodes (e.g., nodes 121A-121D). The nodes may be connected to communicate any suitable information with each other. A node (e.g., node 121A) may include various devices for obtaining, processing, and communicating data. For example, node 121A may include one or more processors, data storage devices (e.g., node 121A may include one or more databases), software applications for processing data, and suitable devices and software applications for controlling the performance of node 121A.

As shown in FIG. 1, nodes of system 101 may be located at different geographical locations. For example, node 121A may be located on the East Coast, and node 121B may be located in the Midwest. FIG. 1 shows users 112 that may be users associated with a first entity, and users 114 that may be users associated with a second entity. For example, the first entity may be an account associated with a particular business (e.g., RingCentral), and a second entity may be an account associated with a particular store (e.g., Marshalls). A large number of users 112 may be located on the West Coast and generally be able to communicate with node 121A of system 101. Communicating with the closest node may be beneficial to eliminate delays associated with network communications over large distances. As shown in FIG. 1, some of users 112 may be located in the Midwest and on the East Coast and may communicate via node 121B. While both nodes 121A and 121B may take the calls, system 101 may be configured to select a single node for determining which agent will handle a particular incoming call. Such a selected node that makes decisions for assigning agents to the call is, herein, referred to as a "master node" or a "master." Also, such a node is referred to as the node that is taking a "master role" in handling the calls. In various embodiments, users related to a single entity are configured to have a single master node. For example, users 112 may have a master node 121A and users 114 may have a master node 121C. In FIG. 1, users 112 communicate with node 121A via connections 117A, and users 114 communicate with node 121C via connections 117C. Connections 117B are used by users 112 to communicate with node 121B, and connections 117D are used by users 114 to communicate with node 121D.

In various embodiments, since only one node is configured to serve as a master node, nodes 121B and 121D are referred to as "support nodes," "slave nodes," or "slaves." In various embodiments, any node may be dedicated to becoming a master for one account and a slave for another account. Also, such nodes are referred to as nodes that are taking a "slave role" in handling the calls. Such slave nodes are configured to take calls from different users, collect user information from different calls (e.g., slave nodes may prompt a user to enter a particular type of information, may verify entered information, may provide feedback if the information is inconsistent and/or incorrect, may playback prerecorded messages, may playback music while a user is waiting for a response, or may provide the user any other information that does not require selecting an agent for the user). While communicating with the user (e.g., by providing a user prerecorded information), a slave node (e.g., node 121B) may communicate user information to a master node 121A, and the master node may select an appropriate agent for handling a call of the user based on the user information provided by node 121B.

In various embodiments, agents may be human operators that may process audio/video call data. Additionally, or alternatively, agents may be computer programs for processing any type of data (e.g., text, image, audio, or video data). For example, a call may include a request for computing a lower-upper (LU) decomposition of a matrix (the matrix may be provided by the user as a part of the call data), and master node 121A may assign an agent that may be a computer program for calculating the LU decomposition, and for communicating calculated data to the user. Thus, the term "agent" should be interpreted broadly and is not limited to a human operator. In some cases, an "agent" may refer to a group of entities for handling the call, where the entities may be a combination of computer programs and/or human operators.

As described above, a single master node may be selected by call handling system 101 for a given group of users (e.g., users 112 associated with a first entity) for the purpose of avoiding any type of synchronization that would be required if multiple nodes were involved in selecting agents. For example, if both nodes 121A and 121B were involved in selecting agents for different users, node 121B would be required to communicate with node 121A, which agents have already been selected, to ensure that node 121A does not "double book" the agent (i.e., does not select an agent to handle a second call, while the agent is handling a first call). While such synchronization is possible, when considering a large number of calls, any delays in synchronization may lead to the agent being double booked. Such situations may lead to cascading communication bottlenecks and other delay-causing network problems, which may be avoided by dedicating a single master node for assigning the agents to the calls.

As an example, as described before, users 114 may be associated with a particular store, such as Marshalls. During the morning hours (e.g., from eight to eleven am), calls from user 114 may predominantly originate from the East Coast (since stores on the West Coast may not be open at that time). For example, ninety-five percent of all calls may originate from the East Coast. Thus, a node of system 101 located at the East Coast may be better equipped to select agents for such calls in order to avoid network delays associated with calls communicated to a node of system 101 located elsewhere (i.e., at a location removed from the East Coast). In an example embodiment, a node on the East Coast (e.g., node 121C) may be assigned to be the master node for users 114 and other nodes (e.g., nodes 121D, 121A, and 121C may be assigned to be slave nodes). However, as time passes throughout the day, the determination of which node may be assigned as a master node and which nodes may be assigned as slave nodes may be reevaluated. For example, if most of the calls are placed after working hours (e.g., between 5 and 8 pm local time), then a node located on the East Coast (e.g., node 121C) may be assigned to be a master node during the hours of 5-7 pm eastern standard time (EST), and node 121D (being, for example in a Central time zone) may be assigned to be a master node between hours of 7-9 pm EST (i.e., between 6-8 pm central standard time (CST)). Further, as the origin of calls moves further west, as determined by a call volume for calls originating from various west locations, system 101 may be configured to reevaluate which node may be assigned as a master node and may assign a node on the West Coast (e.g., node 121A) to be the master node.

The above example of reassigning the master node during the duration of the day is only one illustrative example, and various other approaches may be employed to ensure that costs associated with handling the calls are kept to a minimum. The costs may be evaluated using an appropriate cost function. For example, the cost function F may be given by expression $F(V(X),N)=W_1 C_{cpu}+w_2 C_{net}+w_3 C_{delay}+w_4 C_{traffic}$. In the expression for F, $w_1 \ldots w_4$ may be weights associated with costs $C_{cpu}$, $C_{net}$, $C_{delay}$, and $C_{traffic}$. Cost $C_{cpu}$ may be a cost of processing requests by a given master or slave node. In various embodiments, $C_{cpu}$ may be different for different nodes. For example, node 121C that has a large amount of energy-efficient computing resources may have lower $C_{cpu}$ than $C_{cpu}$ for node 121D. Cost $C_{net}$ may be a cost associated with network traffic. For example, when users 114 are placing calls via connections 117C with master node 121C located in the vicinity of users 114, network traffic costs $C_{net}$ may be lower than in an alternative configuration, at which a master node may be a node located further away from the East Coast (e.g., node 121A). Costs $C_{delay}$ may be evaluated based on a requirement that a user gets a response without a significant delay. For example, for financial data transactions, a substantial delay may lead to financial losses. Thus, while costs $C_{delay}$ are not directly associated with costs for providers of system 101, time delays during communication using system 101 may result in loss of clients that may translate to financial costs for providers of system 101. Further costs $C_{traffic}$ may be associated with costs related to overall traffic to a particular node. The traffic may lead to wear-and-tear of network hardware resources, network delays (which is also related to $C_{delay}$), and risks associated with a network failure. For example, if traffic to a particular node is above a threshold value, a likelihood of a network failure may be sufficiently high to result in unacceptable costs associated with such a failure.

Further, in the expression for cost function $F(V(X_i),N)$, $V(X_i)$ may be a call volume at locations $X_i$, and N may be a number of a node in call handling system 101 that is assigned to be a master node. For example, locations $X_i$ may be locations associated with different geographical regions. Thus, once call volume at different locations is determined, a cost function may be calculated for each configuration of call handling system 101, where the configuration of system 101 is characterized by assigning a particular node N of system 101 to be the master node.

A decision for determining whether or not to reassign a master node may not only be influenced by the value of a cost function as explained above but may also include determining a cost $C_{switch}$ associated with reassigning the role of the nodes. Such cost may involve reallocating resources for a node to take a master role and various other operations (e.g., accessing information about the state of agents by the node) associated with the reassignment of the role for the node.

Figure 2A:
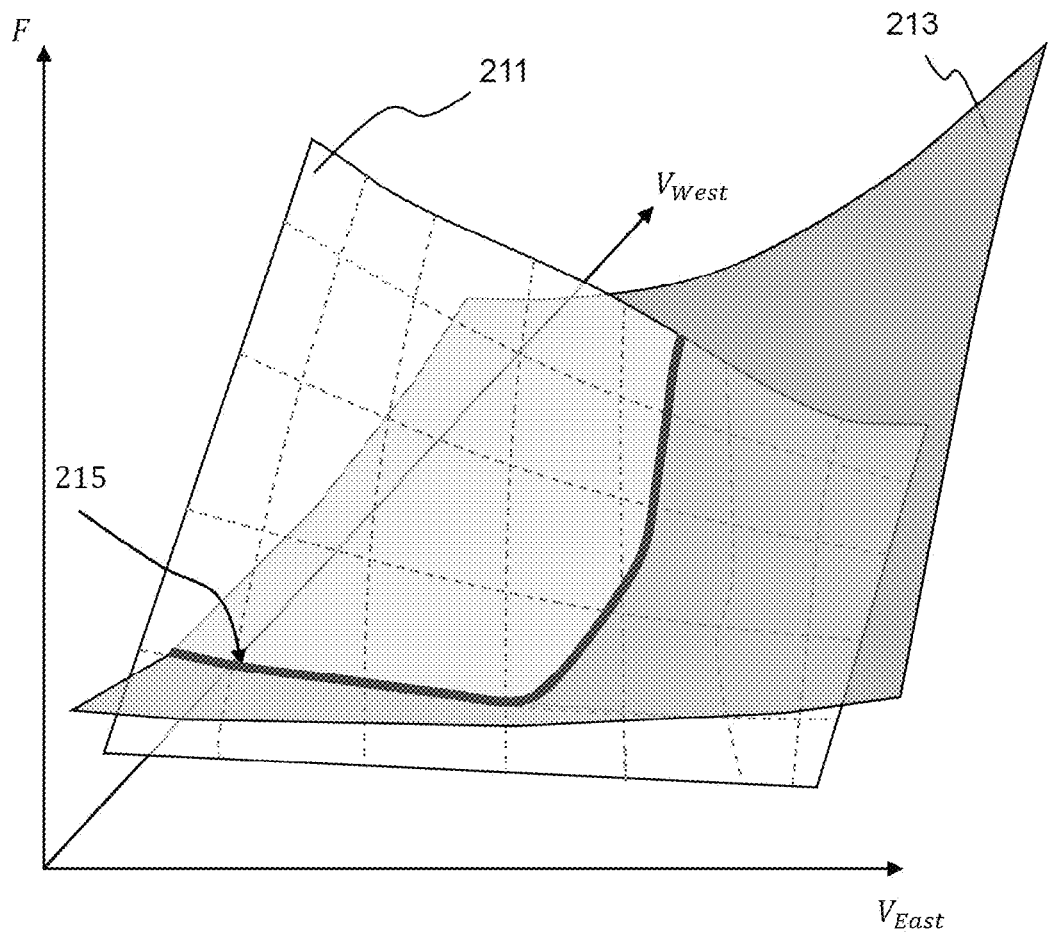
FIG. 2A shows example cost functions for different configurations of a call handling system; the cost functions plotted as functions of call volume at different locations, consistent with disclosed embodiments.
Figure 2B:
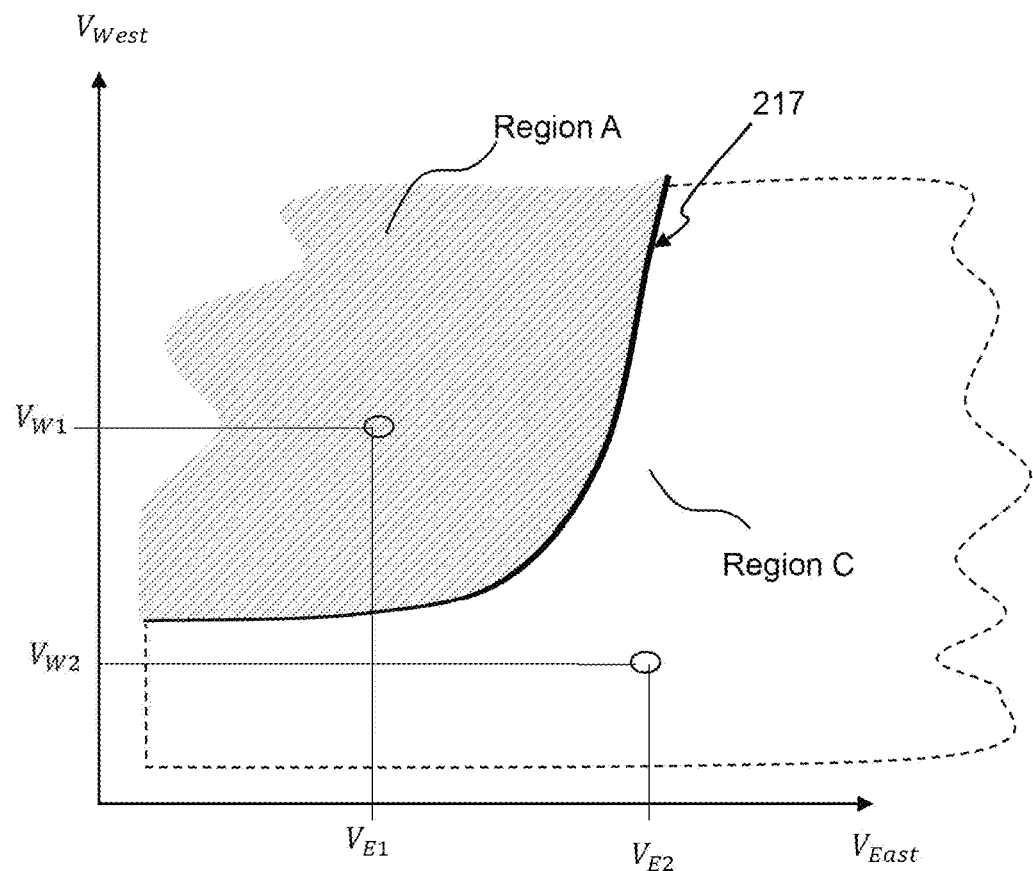
FIG. 2B shows a projection of a curve for which cost functions have the same value, consistent with disclosed embodiments.

Example cost functions 211 and 213 are shown in FIG. 2A and are represented as three-dimensional surfaces. Axis $V_{East}$ may represent a call volume, for example, on the East Coast (first location), and axis $V_{West}$ may represent a call volume, for example, on the West Coast (second location). In an example embodiment, cost function 211 may be associated with node 121C being a master node, and cost function 213 may be associated with node 121A being a master node. As seen in FIG. 2A, cost function 211 decreases towards increasing $V_{East}$ and increase towards increasing $V_{West}$. Cost function 213 decreases towards increasing $V_{West}$ and increase towards increasing $V_{East}$. An intersection curve 215 (at which cost functions 211 and 213 intersect) may be a decision curve, as further explained below. FIG. 2B shows decision curve 217 being a projection of curve 215 onto a $V_{East}$–$V_{West}$ plane. A region A corresponds to the region at which cost function 213 is lower than cost function 211. Thus, for call volumes with values within region A (e.g., call volumes characterized by a point $\{V_{E1}, V_{W1}\}$, a node 121A may be selected as the master node. Alternatively, for points such as $\{V_{E2}, V_{W2}\}$ located in region C, a node 121C may be selected as a master node.

Figure 2C:
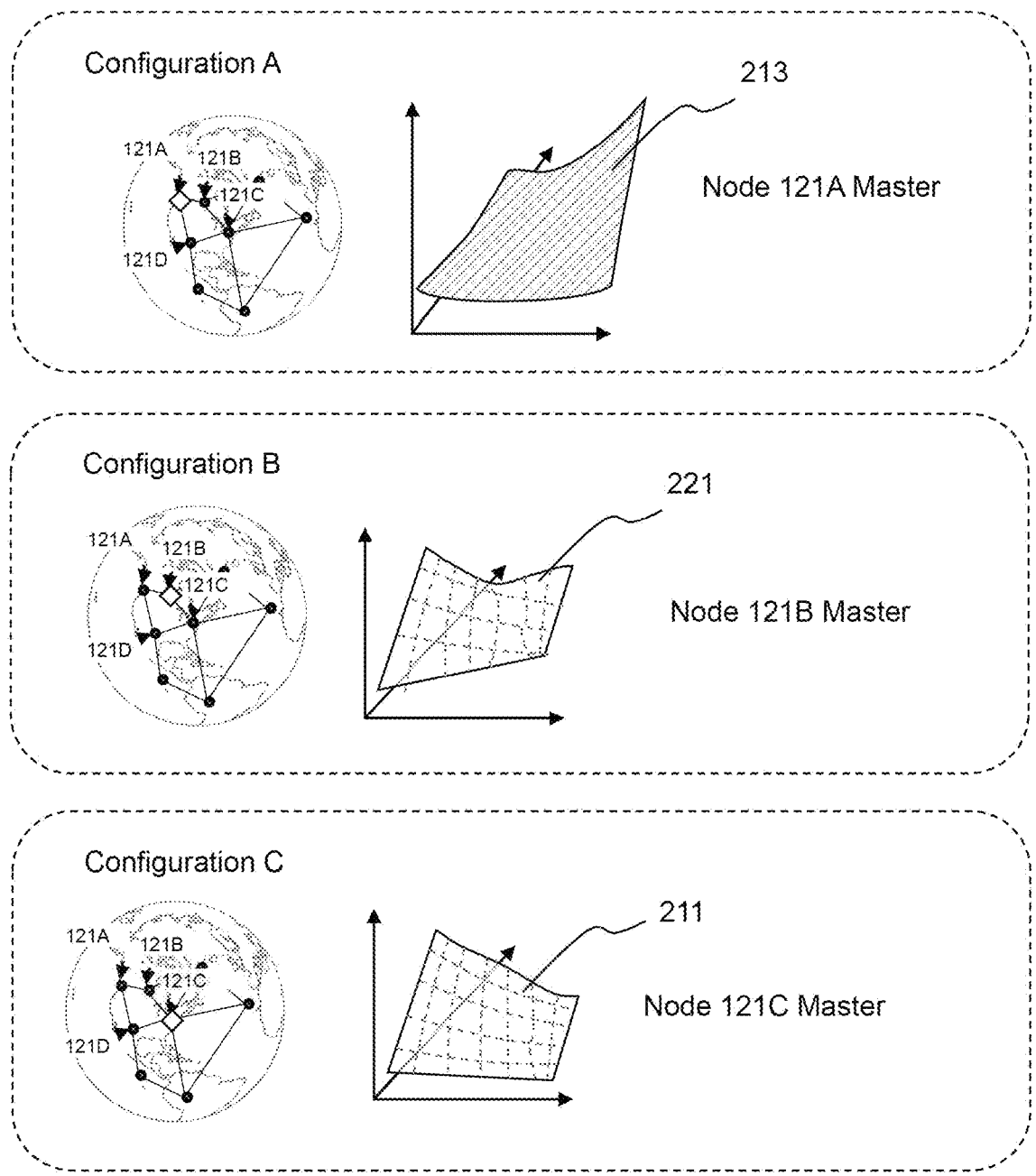
FIG. 2C shows example cost functions for different configurations of a call handling system, consistent with disclosed embodiments.

FIG. 2C further illustrates different configurations for system 101. In configuration A, node 121A is chosen to be a master node resulting in a cost function 213, in configuration B, node 121B is chosen to be a master node resulting in cost function 221, and in configuration C, node 121C is chosen to be a master node resulting in cost function 211.

In various embodiments, a service quality metric may be further introduced and may be related to a service quality experienced by the users. For example, a reassigning of a master role and a slave role for a node handling a particular account may be based upon improving the service quality metric. While a cost associated with a network delay $C_{delay}$ was previously related to total cost, alternatively, $C_{delay}$ may be considered as a factor for determining the service quality metric. For example, if a user is experiencing a delay during a process of assigning an agent to the call, such a delay cost may affect the service quality metric. Further, the service quality metric may be affected by a delay in response from an agent handling a call. For instance, if a call corresponds to data that requires a time-sensitive response (e.g., when data is a request of a video game for a response or a request for a financial data, and the like) the service quality metric may be affected by delays in response from the agent. To improve the service quality metric, call handling system 101, as shown in FIG. 1, may be configured to assign to the incoming calls the agents located in proximity to a geographical location of users placing the calls (e.g., geographical locations at which the calls are originating), to reduce latency times in the agents' responses.

Reducing latency time may be one of the parameters that may affect the service quality metric, other parameters may include competency of agents assigned to the calls, the experience of the agents, rating of the agents (e.g., users placing the calls may be allowed to rate the agents), computer resources available to the agents (e.g., if an agent is a software application, computer resources available to such an application may be an important factor affecting the service quality metric), human characteristics of the agents (e.g., a language or accent of the agents, nationalities of the agents, sex of the agents, political affiliations of the agents, and the like). In an example embodiment, the service quality metric may be computed as a weighted average of various parameters that may affect the service quality metric with different weights selected to improve overall user experience.

In an example embodiment, a node assigned to a master role for an account (such node may be referred to as a master node for that account) may determine agents for a group of users (e.g., users that represent a Walmart). In an alternative embodiment, a node may be assigned to a master role for a particular type of agent. For example, a first node may be assigned a master role for selecting agents that do LU decomposition of a matrix, while a second node may be assigned a master role for selecting agents that process financial transactions. For such an embodiment, when a request (call) is placed with a calling system, a node assigned a slave role for handling calls may determine a type of request (e.g., a request may require LU decomposition of the matrix) and direct the request to an appropriate master node (i.e., the first master node) for selecting the right agent capable of performing LU decomposition. Since different master nodes represent different types of agents, the same agent may be represented by a single master node, thus eliminating a need for synchronization among multiple master nodes.

Figure 3A:
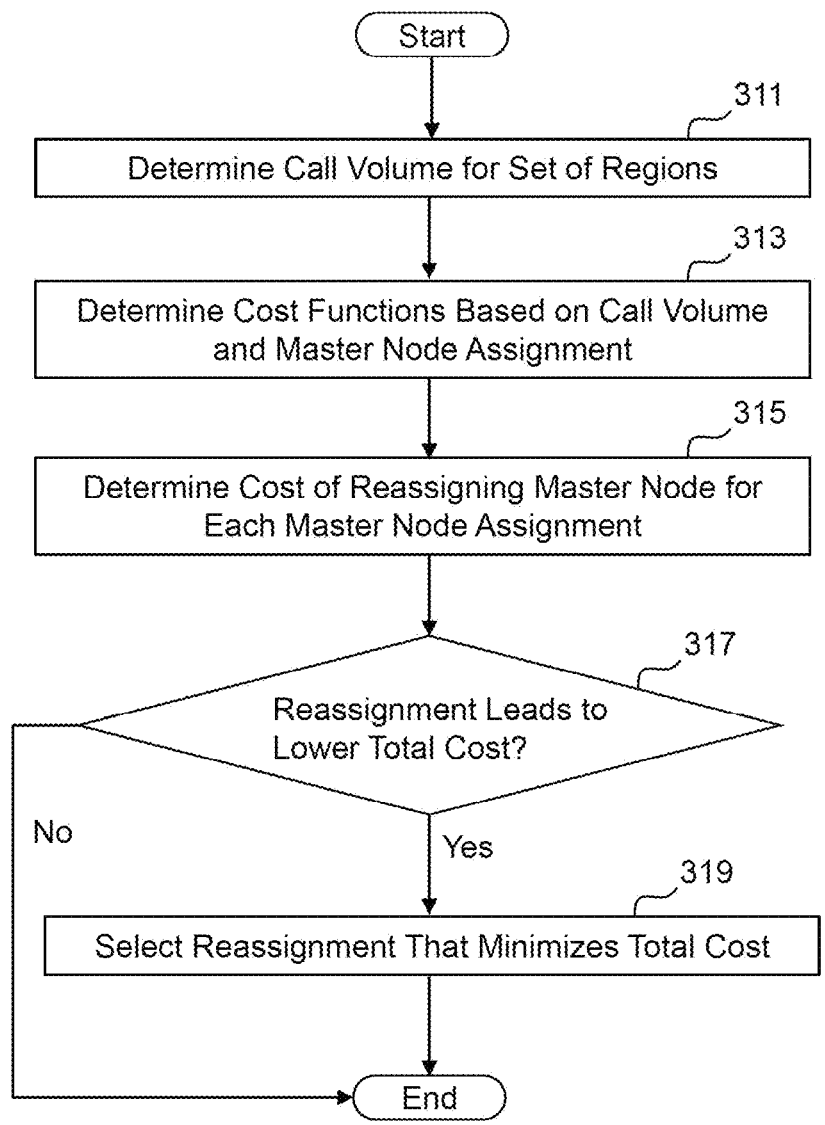
FIG. 3A shows an example process for determining a configuration of a call handling system that results in minimized costs associated with operating the call handling system, consistent with disclosed embodiments.

FIG. 3A shows an example process 301 for determining the roles of different nodes of system 101. At step 311 system 101 may determine call volumes $V(X_i)$ for a set of different geographical regions $X_i$ for users associated with a given entity (e.g., the given entity may be a store, a business, an organization, a computer program, a server, a group of servers, a group of people, and the like). Call volumes $V(X_i)$ may be represented by a vector $\{V_1, V_2, \ldots V_i, \ldots V_N\}$, where $V_i$ is a call volume at location $X_i$. For example at step 311, system 101 may determine that $V_1$=10,000 calls have originated from the East Coast, $V_2$=2,000 calls have originated from the Midwest and $V_3$=100 calls have originated from the West Coast. The above example is only illustrative, and any other breakdown based on geographical regions can be used. At step 313, a cost function may be computed based on call volumes $\{V_1, V_2, \ldots V_i, \ldots V_N\}$, and the assignment of a master node (e.g., as shown in FIG. 2C, the cost function depends on the configuration of system 101 characterized by the assignment of the master node).

At step 315, a cost of reassigning a master node may be computed. For example, if a system 101 is in configuration A, as shown in FIG. 2C, at step 315, a cost of switching from configuration A to configuration B or switching from configuration A to configuration C may be evaluated. At step 317, system 101 may evaluate whether the reassignment may lead to lowering a total cost associated with processing calls by the call handling system 101. If the total cost may be reduced (step 317, Yes), process 301 may proceed to step 319 and select a reassignment (i.e., select which node will be assigned to be the master node) that minimizes a total cost. Herein, the total cost includes a cost associated with a cost function for a configuration of system 101 when a new node is assigned to be the master node and a cost of a process of reassigning the master node, as evaluated at step 315. After completion of step 319, process 301 may be completed. Alternatively, if the total cost may not be reduced (step 317, No), process 301 may be completed.

Figure 3B:
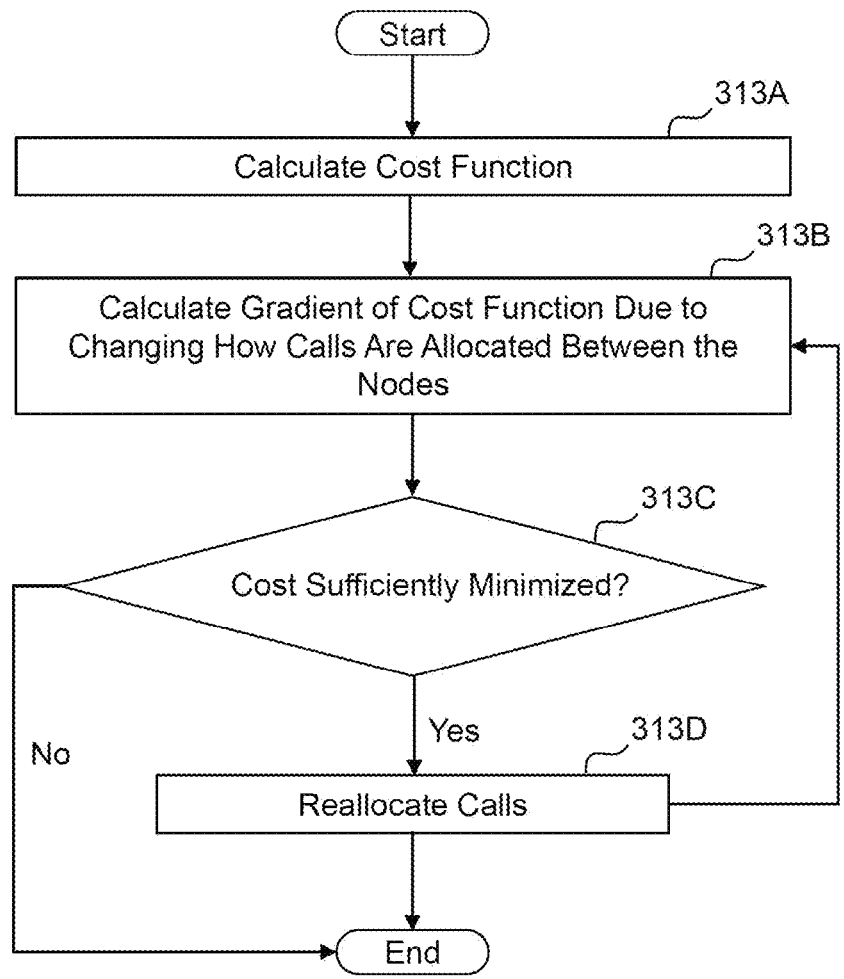
FIG. 3B shows sub-steps of a step of a process shown in FIG. 3A, consistent with disclosed embodiments.
Figure 4:
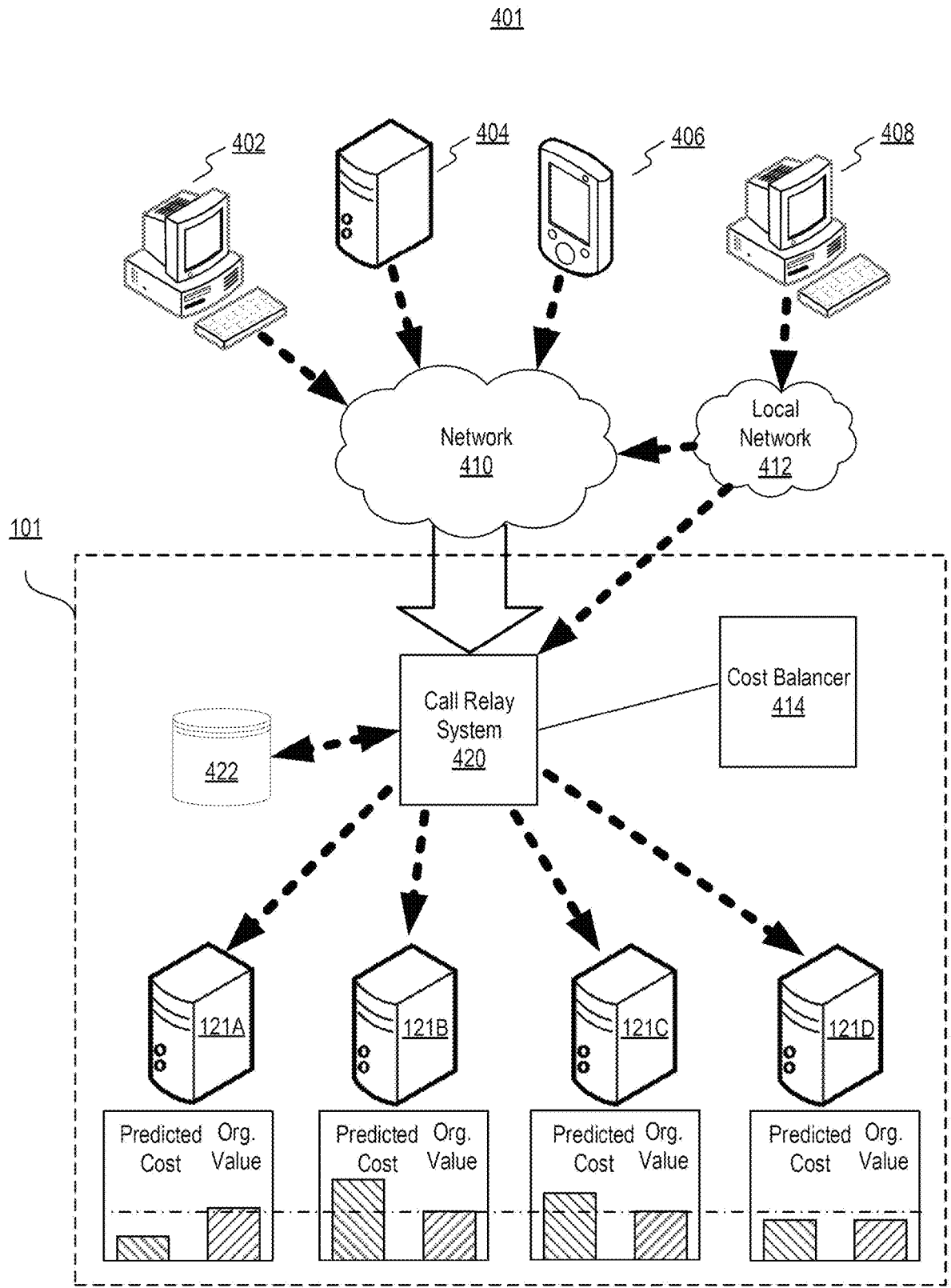
FIG. 4 is an example diagram of a system of handling calls, including a cost balancer, consistent with disclosed embodiments.

FIG. 3B shows a detailed implementation of step 313 of process 301. Step 313 may include sub-steps 313A-313D, as described below. At sub-step 313A the cost function F(V($X_i$),N) may be calculated for a call volume V($X_i$) and node N being a master node. However, cost function F may also depend on how the calls are distributed between slave and master nodes. For example, if there is a first slave node located in New York City, and a second slave node located in Richmond, Va., calls originating from the East Coast may be distributed differently between these two slave nodes and may result in different values of cost function F. For example, if all the calls originating in the Richmond area are directed towards the first node, and all the calls originating in New York City are directed towards the second node, the cost function may not be minimized. The exact value of cost function depends on traffic to each slave node, traffic between slave nodes and a master node, and a CPU load for slave nodes. At sub-step 313B, a cost balancer 414, as shown in FIG. 4, may be configured to calculate the gradient of a cost function due to changes related to how the calls are allocated between the nodes. In some cases, cost balancer 414 may be an optional entity, and nodes 121A-121D may negotiate balancing the calls directly between each other. In some cases, cost balancer 414 may be implemented as a software application and may be executed by a few or all of the nodes 121A-121D. If cost function can be sufficiently minimized (herein a term sufficiently refers to a type of minimization that is worth pursuing; for example, if costs are minimized by a fraction of a dollar, such costs may not be worth implementing, as the implementation of such costs and determination of these costs may have their own associated costs), (sub-step 313C, Yes), at sub-step 313D, cost balancer may be configured to reallocate the calls between different nodes. In some cases, determining whether the cost function is sufficiently minimized includes determining whether the cost function is reduced by at least a minimum required value when the calls are reallocated. After completing sub-step 313D, step 313 may proceed again to sub-step 313B. Alternatively, if cost function cannot be sufficiently minimized (sub-step 313C, No), step 313 may be completed.

In various embodiments, steps of process 311 may be executed by an appropriate computing system associated with system 101. Such a computing system may be referred to as a cost balancer. FIG. 4 shows an example of a system configuration in which cost balancing techniques consistent with the claimed invention may be implemented. As shown in FIG. 4, system 401 may include client devices 402-408, and a system 101 (previously introduced in FIG. 1), where system 101 may include a call relay system 420, a cost balancer 414, nodes 121A-121C, as previously presented in FIG. 1, system network 430, and a database 422. As shown in FIG. 4, devices 402-408 may connect with system 101 via a network 410, and/or a local network 412. The components and arrangements shown in FIG. 4 are not intended to limit the disclosed embodiments, as the components used to implement the disclosed processes and features may vary. Thus, system 401 may further include other components or devices that perform or assist in the performance of one or more processes consistent with the disclosed embodiments. As shown in FIG. 4, system network 430 may be a network for communicating information between call relay system 420 and slave and master nodes. Further, system network 430 may be used for communication between slave and master nodes.

As depicted in FIG. 4, client devices 402-408 may be implemented using a variety of different equipment, such as supercomputers, personal computers, servers, mainframes, mobile devices, smartphones, tablets, thin clients, or the like. Client devices 402-408 may be connected to a network such as network 410 or local network 412.

Network 410 and/or system network 430 may include one or more interconnected wired or wireless data networks that receive data from one device (e.g., user device 102) and send it to another device (e.g., cost balancer 414). For example, network 410 may be implemented as the Internet, a wired Wide Area Network (WAN), a wired Local Area Network (LAN), a wireless LAN (e.g., IEEE 802.11, Bluetooth, etc.), a wireless WAN (e.g., WiMAX), or the like. Local network 412 may be implemented in a similar manner and may be connected to network 410. Each component in system 401 may communicate bidirectionally with other system 401 components either through network 410, local network 412, or through one or more direct communication links (not shown).

In various embodiments, the calls may be first handled by a call relay system 420 that may be configured to direct calls to various nodes 121A-121C. In various cases, call relay system 420 may be a distributed system with different call relay stations placed at different geographical locations. For example, at each geographical location, a local call relay station may be configured to accept calls originating from that geographical location.

As described above, nodes 121A-121C may be configured to handle call related information regardless of their roles (i.e., both slave and master nodes may be configured to handle call related information). As described above, the call may include any suitable information that may be used to determine a type of the call and how the call needs to be processed. For example, a call may include a computer-implemented task that requires the use of large amounts of data (e.g., thousands or millions of records in a database). During a placement of such a call, information related to the task (e.g., the information may include requests to an agent that will be handling the processing of the call) may be communicated using any suitable means (e.g., by translating requests of the call into a programming or notation language (e.g., Java, Python, Scala, R, or the like), using a graphical user interface, or using another method for communicating such information.

As shown in FIG. 4, cost balancer 414 may collect information about a call volume from call relay system 420 (including information on where the calls originate). Cost balancer 414 may be implemented using a variety of different equipment, such as one or more supercomputers, one or more personal computers, one or more servers, one or more mainframes, one or more mobile devices, one or more smartphones, one or more tablets, one or more thin clients, or the like.

In various embodiments, cost balancer 414 may store system configuration (e.g., configurations A-C as shown in FIG. 2C), associated volume calls from different geographic locations as costs associated with operating call handling system 101 in a database 422. Such information may be used for predicting costs and for determining system 101 configuration for future times. Additionally, cost balancer 414 may be configured to collect unusual activity detected in a network (e.g., traffic spikes, traffic lulls, unusual traffic patterns, and the like) and store such information in database 422. Such unusual traffic patterns may be further analyzed by administrators of system 101 and/or computer models (e.g., computer-learning models) to determine the cause of such unusual activity. Further, cost balancer 414 may be configured to store information related to any failures of a network (e.g., communication line failures, network hardware failures, computing resources failures, and the like).

Database 422 may be implemented as one or more databases configured to store datasets. Database 422 may be implemented using document management systems, Microsoft SQL databases, SharePoint databases, Oraclem databases, Sybase™ databases, or other relational databases, or non-relational databases such as key-value stores or NoSQL databases such as Apache HBasem. In some embodiments, database 422 may comprise an associative array architecture, such as key-value storage, for storing and rapidly retrieving large amounts of information.

Each node 121A-121C may be implemented using a variety of different equipment, such as a supercomputer, a server, a mainframe, or, in some cases, a mobile computer system having a wireless or wired connection to network 410.

In addition to illustrating components of system 401, FIG. 4 illustrates data flow and normal operation of system 401. As shown, client devices 102-108 place calls to call handling system 101 via network 410 and/or 412 and are first handled by a call relay system 420, which may be configured to communicate a call volume to cost balancer 414. In an example embodiment, a call may originate from a client device (e.g., device 102), which may comprise a desktop computer associated with a company employee. The employee may enter a request for a daily report for the organization. In response to the input request, client device 102 may generate and transmit a call to system 101 to obtain the daily report. As another example, client device 104 may comprise a server operated by a third party that handles credit card transactions. In response to a credit card authorization request received from a merchant, client device 104 may generate a call that includes information for completing the financial transaction.

Figure 5:
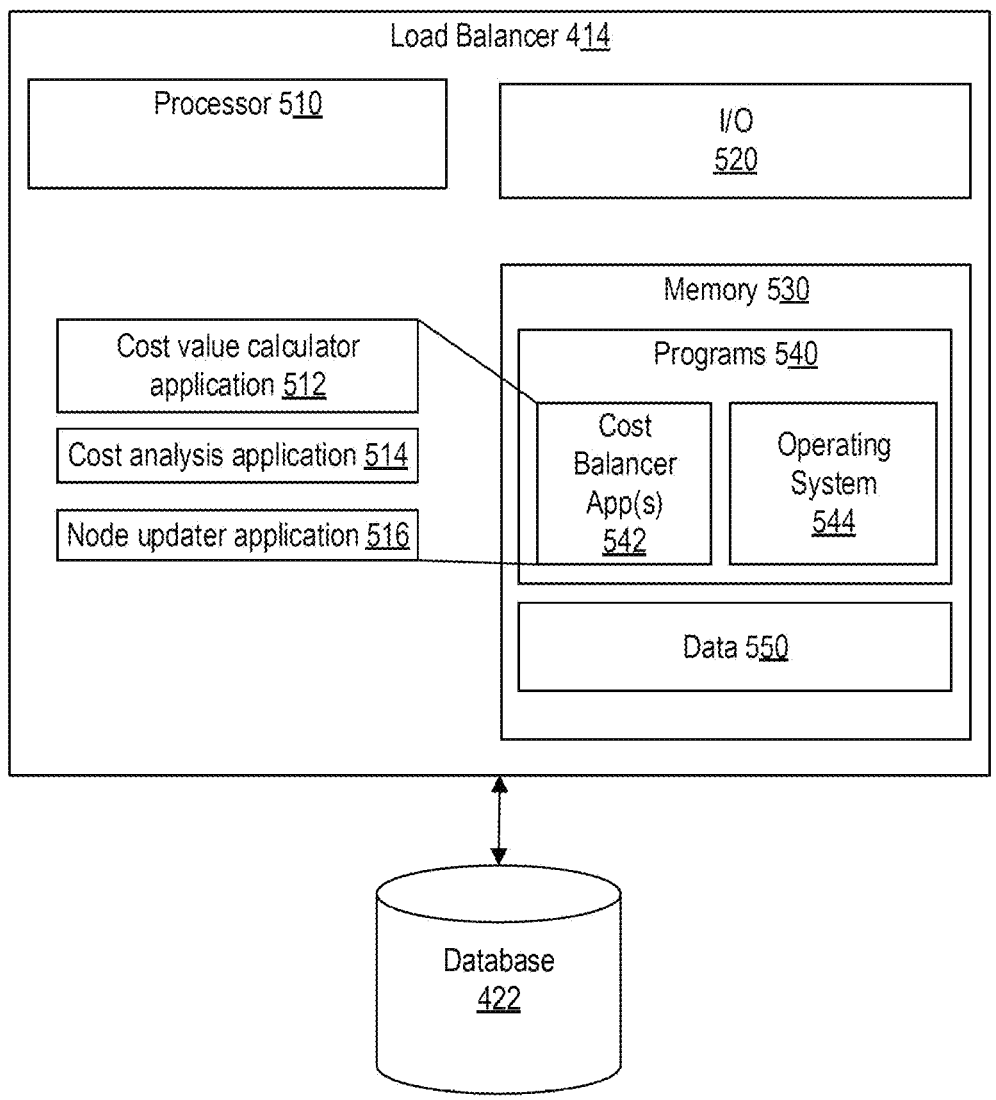
FIG. 5 is a diagram of an example cost balancer configured to perform functions of the disclosed methods, consistent with disclosed embodiments.

FIG. 5 is a diagram of an example cost balancer (e.g., cost balancer 414, as shown in FIG. 4) configured to perform functions of the disclosed methods, consistent with disclosed embodiments.

As shown, cost balancer 414 may include one or more processors 510, input/output ("I/O") devices 520, memory 530 for storing programs 540 (including, for example, cost balancer app(s) 542 and operating system 544) and data 550, and a database 422. Cost balancer 414 may be a single server or may be configured as a distributed computer system including multiple servers or computers that interoperate to perform one or more of the processes and functionalities associated with the disclosed embodiments. In some embodiments, cost balancer 414 is specially configured with hardware and/or software applications 542 for performing functions of disclosed methods. For example, cost balancer 414 may include a cost value calculator application 512, cost analysis application 514, and node reassigning application 518. The applications may be implemented as a specialized software executable by processor 510.

Processor 510 may be one or more known or custom processing devices designed to perform functions of the disclosed methods, such as a single core or multiple core processors capable of executing parallel processes simultaneously. For example, processor 510 may be a single-core processor configured with virtual processing technologies.

In certain embodiments, processor 510 may use logical processors to simultaneously execute and control multiple processes. Processor 510 may implement virtual machine technologies, or other known technologies to provide the ability to execute, control, run, manipulate, store, etc. multiple software processes, applications, programs, etc. In another embodiment, processor 510 may include a multiple-core processor arrangement (e.g., dual-core, quad-core, etc.) configured to provide parallel processing functionalities to allow cost balancer 414 to execute multiple processes simultaneously. One of ordinary skill in the art would understand that other types of processor arrangements could be implemented that provide for the capabilities disclosed herein.

Cost analysis application 514 may also include one or more I/O devices 520 that may comprise one or more interfaces for receiving signals or input from devices and providing signals or output to one or more devices that allow data to be received and/or transmitted by cost balancer 414. For example, cost balancer 414 may include interface components, which may provide interfaces to one or more input devices, such as one or more keyboards, mouse devices, and the like, that enable cost balancer 414 to receive input from a user or administrator (not shown).

Cost balancer 414 may include one or more storage devices configured to store information used by processor 510 (or other components) to perform certain functions related to the disclosed embodiments. In one example, cost balancer 414 may include memory 530 that includes instructions to enable processor 510 to execute one or more applications, such as server applications, an electronic transaction application, an account status application, network communication processes, and any other type of application or software known to be available on computer systems. Alternatively, or additionally, the instructions, application programs, etc. may be stored in database 422 that may be in direct communication with cost balancer 414. Database 422 or other external storage may be a volatile or non-volatile, magnetic, semiconductor, tape, optical, removable, non-removable, or other types of storage devices or tangible (i.e., non-transitory) computer-readable medium.

In one embodiment, cost balancer 414 may include memory 530 that includes instructions that, when executed by processor 510, perform one or more processes consistent with the functionalities disclosed herein. Methods, systems, and articles of manufacture consistent with disclosed embodiments are not limited to separate programs or computers configured to perform dedicated tasks. For example, cost balancer 414 may include memory 530 that may include one or more programs 540 to perform one or more functions of the disclosed embodiments. Moreover, processor 510 may execute one or more programs that may be stored at a remote location (i.e., a location remote from cost balancer 414). For example, cost balancer 414 may access one or more remote programs that, when executed, perform functions related to disclosed embodiments.

Programs 540 stored in memory 530 and executed by processor(s) 510 may include one or more cost balancer app(s) 542 and operating system 544. Cost balancer app(s) 542 may include one or more data analysis applications that cause processor(s) 510 to execute one or more processes related to receiving information about a call volume from calls of various users, analyzing the geographical location of the calls, analyzing current costs associated with operating call handling system 101, determining ways in which the cost may be reduced by reassigning roles for nodes of system 101, and determining based on a cost analysis a master node reassigning (i.e., determining a node that will be assigned as a new master node). In some embodiments, processor 510 may be configured to process received data and information, generate and/or store a list of nodes that may be candidates for becoming a master node, determine the system configuration that leads to a reduced total cost, and administer a reassigning of nodes.

Memory 530 and database 422 may include one or more memory devices that store data and instructions used to perform one or more features of the disclosed embodiments. Memory 530 and database 422 may also include any combination of one or more relational and/or non-relational databases controlled by memory controller devices (e.g., server(s), etc.) or software, such as document management systems, Microsoft SQL databases, SharePoint databases, Oracle™ databases, Sybase™ databases, or other relational databases, or non-relational databases such as key-value stores or NoSQL databases such as Apache HBase™. In some embodiments, memory 530 and/or database 522 may comprise an associative array architecture, such as key-value storage, for storing and rapidly retrieving large amounts of information about an individual.

Cost balancer 414 may also be communicatively connected to one or more remote memory devices (e.g., remote databases (not shown)) through network 110 or a different network. The remote memory devices may be configured to store information and may be accessed and/or managed by cost balancer 414.

As shown in FIG. 5, cost balancer applications 542 may include cost value calculator application 512, cost analysis application 514, and node updater application 516. Application 512 may be used by cost balancer 414 to compute cost functions $F(V(X_i),N)$, and cost $C_{Switch}$ as previously described. In various embodiments, application 512 may be configured to compute $F(V(X_i),N)$, and cost $C_{Switch}$ for a given system configuration (e.g., configuration A-C, as shown in FIG. 2C).

Cost analysis application 514 may be used to determine a system configuration that leads to the lowest total cost. For example, application 514 may use costs obtained from application 512, and select a configuration leading to the lowest total cost.

Once cost analysis application 514 determines the configuration of system 101 that results in the lowest total cost, application 516 may be used to reassign roles of various nodes in system 101. For example, if application 514 determines that node 121A needs to be assigned a master role and node 121C, which was previously operated in a master role, needs to be assigned a slave role, such process of reassigning may be performed by application 516. For example, application 516 may transmit information about the availability of agents and their status to node 121A. In some cases, a process of assigning node 121A to be a master node may include starting a computer-based service at node 121A for performing master node duties (e.g., receiving data from slave nodes and assigning agents to calls), and terminating a similar service at a node 121C that was previously performed master node duties. In an example embodiment, when reassigning node roles, all the incoming calls may be placed on a brief hold and subsequently requests for agents to be redirected to a new master node. In various embodiments, during a process of reassigning a node, various slave nodes may be configured to redirect information related to received calls by these slave nodes to a new master node.

Figure 6:
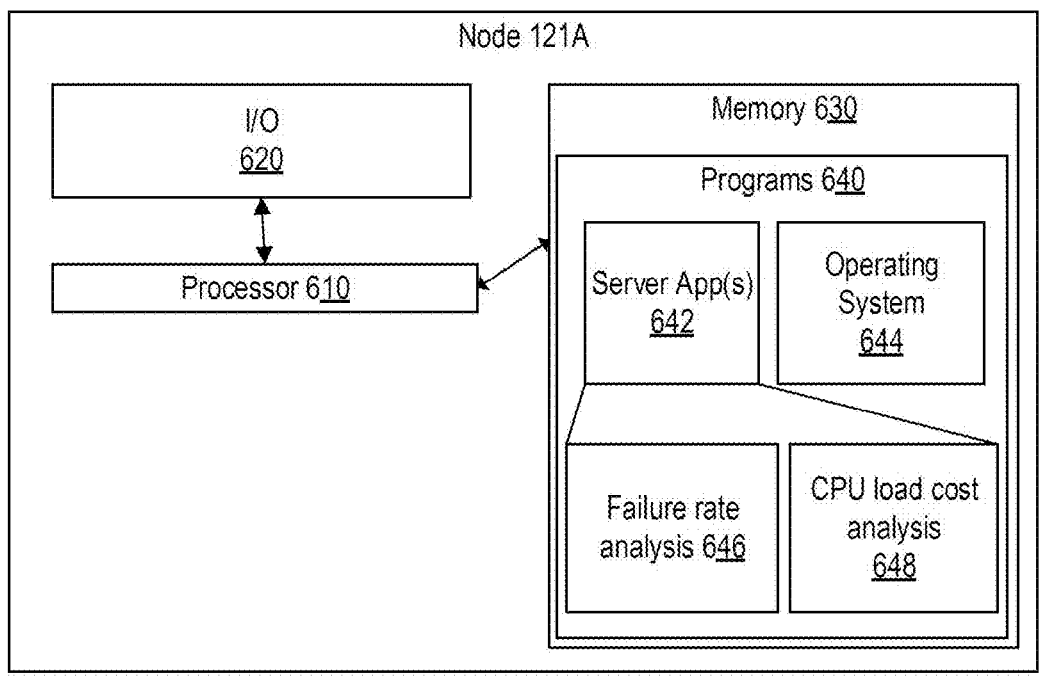
FIG. 6 is a diagram of an example node configured to perform functions of the disclosed methods, consistent with disclosed embodiments.

FIG. 6 is a diagram of node 121A configured to perform functions of the disclosed methods, consistent with disclosed embodiments. Node 121A may be similar in hardware and functionality to other nodes 121B-121D. As shown, node 121A may include one or more processor 610, input/output ("I/O") devices 620, memory 630 for storing data and programs 640 (including, for example, server app(s) 642 and operating system 644). In some cases, node 121 may be connected to a database. Node 121A may be a single server or may be configured as a distributed computer system including multiple servers or computers that interoperate to perform one or more of the processes and functionalities associated with the disclosed embodiments. In some embodiments, node 121A is specially configured with software applications (e.g., applications 642) for performing functions of disclosed methods.

Programs 640 stored in memory 630 and executed by processor(s) 610 may include one or more server app(s) 642 and operating system 644. Server app(s) 642 may include one or more data analysis applications such as failure rate analysis 646 and CPU load cost analysis 648. For example, failure rate analysis 646 may evaluate a likelihood of failure based on CPU loads and historical failures known for node 121A. Further, failure rate analysis 646 may incorporate various performance data (e.g., processor temperature, airflow rate, and the like) to assess the likelihood of the failure.

CPU load cost analysis 648 may determine a cost $C_{CPU}$, as previously described, and communicate the determined cost to cost balancer 414 via I/O 620.

Processor 610 may be one or more known or custom processing devices designed to perform functions of the disclosed methods, such as a single core or multiple core processors capable of executing parallel processes simultaneously, similar to processor 610.

Node 121A may also include one or more I/O devices 620 that may comprise one or more interfaces for receiving signals or input from devices and providing signals or output to one or more devices that allow data to be received and/or transmitted by node 121A. For example, node 121A may include interface components, which may provide interfaces to one or more input devices, such as one or more keyboards, mouse devices, and the like, that enable node 121A to receive input from a user or administrator (not shown).

Node 121A may include one or more storage devices configured to store information used by processor 610 (or other components) to perform certain functions related to the disclosed embodiments. In one example, node 121A may include memory 630 that includes instructions to enable processor 610 to execute one or more applications, such as server applications, an electronic transaction application, an account status application, network communication processes, and any other type of application or software known to be available on computer systems. Alternatively, or additionally, the instructions, application programs, etc. may be stored in a database or any other suitable external storage (not shown) in direct communication with node 121A, such as one or more database or memory accessible over network 110. The database or other external storage may be a volatile or non-volatile, magnetic, semiconductor, tape, optical, removable, non-removable, or other types of storage devices or tangible (i.e., non-transitory) computer-readable medium.

In one embodiment, node 121A may include memory 630 that includes instructions that, when executed by processor 610, perform one or more processes consistent with the functionalities disclosed herein. Methods, systems, and articles of manufacture consistent with disclosed embodiments are not limited to separate programs or computers configured to perform dedicated tasks. For example, node 121A may include memory 630 that may include one or more programs 640 to perform one or more functions of the disclosed embodiments. Moreover, processor 610 may execute one or more programs that may be located remotely. For example, node 121A may access one or more remote programs that, when executed, perform functions related to disclosed embodiments.

Figure 7:
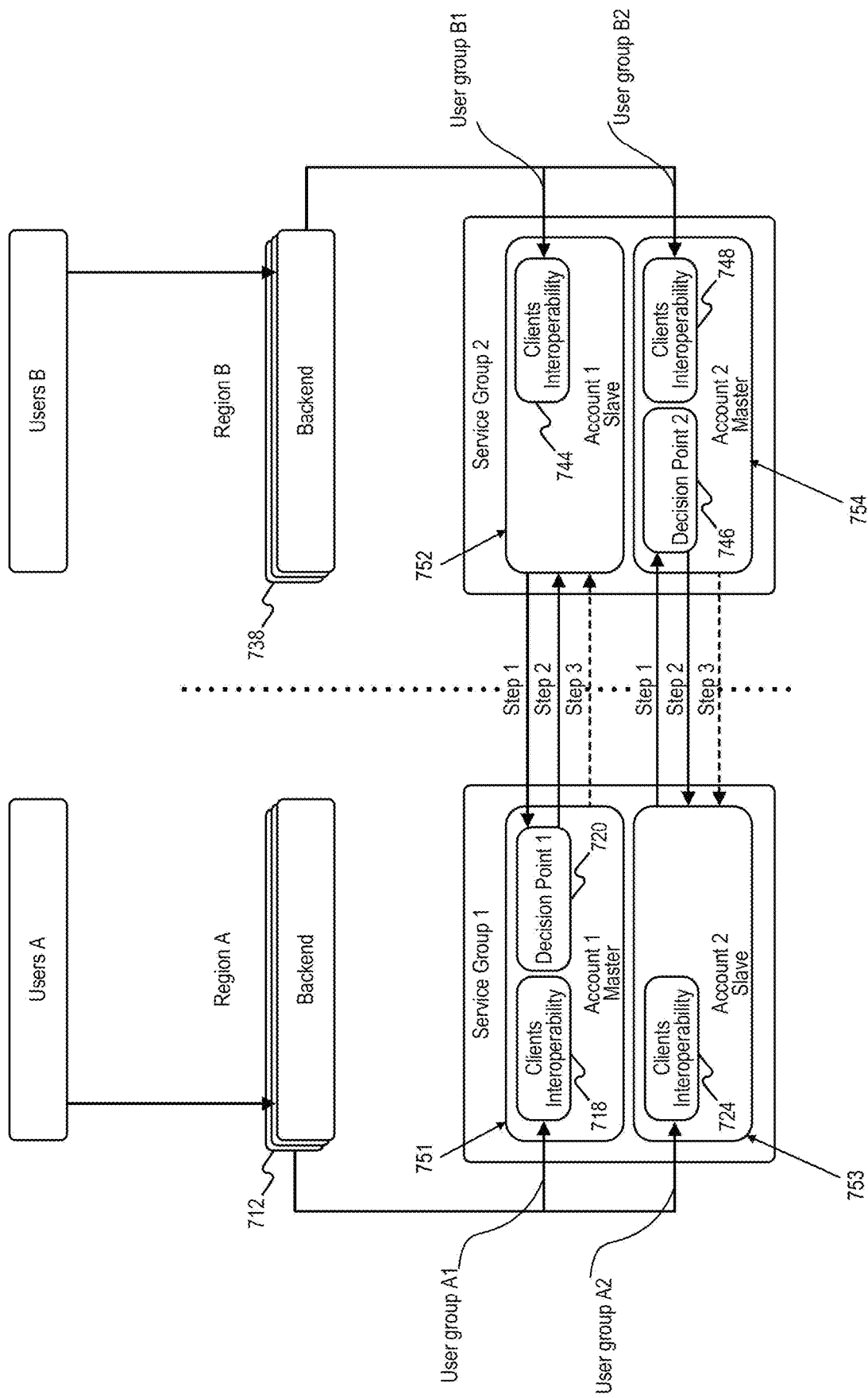
FIG. 7 is a diagram of an example call handling system, consistent with disclosed embodiments.

FIG. 7 is a diagram of an example configuration of system 101 for handling calls across multiple regions, consistent with disclosed embodiments. As shown in FIG. 7, users A and B may place calls within two different geographical regions (e.g., region A and B, respectively), and system 101 may be configured to use two different service groups (e.g., service group 1 and service group 2, respectively) for processing calls from users A and B. In various embodiments, a service group may be a software application dedicated for processing a set of calls from users in real-time. In various embodiments, a service group may be run as an instance of a service. For example, a first instance of service group 1 (e.g., instance 751) may be run to handle calls for a first group of users (e.g., a user group A1) that may be associated with Walmart stores, and a second instance of service group 1 (e.g., instance 753) may be run to handle calls for a second group of users (e.g., a user group A2 associated with Rainbow Bar & Grill bar). The calls from groups A1 and A2 may originate from the West Coast. Similarly, service group 2 may have instances 752 and 754 for handling calls of different users. For example, instance 752 may handle a user group B1 of users associated with Walmart stores, and instance 754 may handle a user group B2 of users associated with Rainbow Bar & Grill bar, with calls for groups B1 and B2 originating from the East Coast.

In some embodiments, each instance of a service group (e.g., instances 751-754) may include respective client interoperability modules 718, 744, 724, 748 that may be used to interact with a client to collect call-related information. For example, a client interoperability module may prompt a user to enter call related information (e.g., by selecting options during a call by pressing phone keys, or by using a voice). In various embodiments, a client interoperability module can provide a user with any suitable interface for entering information. In some cases, the client interoperability module may provide automated responses to the user, may entertain the user (e.g., playback music to the user), and/or provide any other services to the user that do not require an active agent for handling the call of the user.

As shown in FIG. 7, instances of a service group 1 or 2 may be assigned to perform the role of a slave or a master. While previously a role of a slave or a master was associated with a node (e.g., nodes 121A-121D), a role of a slave or a master for a node may be related to a particular instance of a service group (i.e., to a particular software that is being used for handling calls). For example, for instance 751, node 121A may be a master, and for instance 753 node 121A may be a slave. As shown in FIG. 7, for account 1 (e.g., an account associated with Walmart stores) node 121A may operate in a master role and for account 2 (e.g., an account associated with Rainbow Bar & Grill) node 121A may operate in a slave role. In some cases, it may be said that an instance of a service group hosted by a node operates in a slave or master role.

As shown in FIG. 7, calls from users A and B are initially handled by backends 712 and 738. The backends may perform operations similar to operations of call relay system 420 (i.e., operations related to directing calls to various nodes 121A-121D).

Calls from user group A1 may be received by instance 751 that may be assigned to operate as a master. The calls may be first handled by client interoperability module 718 and then submitted to a decision point module 1 for selecting an agent for handling the calls of user group A1. Calls from user group B1 are received by instance 752 corresponding to account 1, where instance 752 may be assigned to operate as a slave. The calls are first handled by client interoperability module 744, and then information related to these calls may be communicated to instance 751 that operates as a master. The information relating to the calls of group B1 may be communicated in a series of steps. In a first step (step 1), instance 752 may request instance 751 to accept the information about the call, and in a second step (step 2), instance 751 communicates that information may be accepted. Further, at a second step, instance 751 may communicate how long it may take to assign an agent. At step 3, when the agent becomes available, instance 751 communicates to instance 752 the information about the call, and instance 751 transmits the information to an agent handling the call.

A similar procedure is employed for instances 753 and 754 for an account 2. Calls from user group A2 are handled by instance 753 being in the role of a slave, and calls from user group B2 are handled by instance 754 being in the role of a master. The calls from group A2 are first handled by module 724, and calls from group B2 are first handled by module 748. While information related to calls from group B2 can be processed by decision point 2, information related to calls from group A2 is communicated from instance 753 to instance 754 via steps 1-3, as described above.

Figure 8:
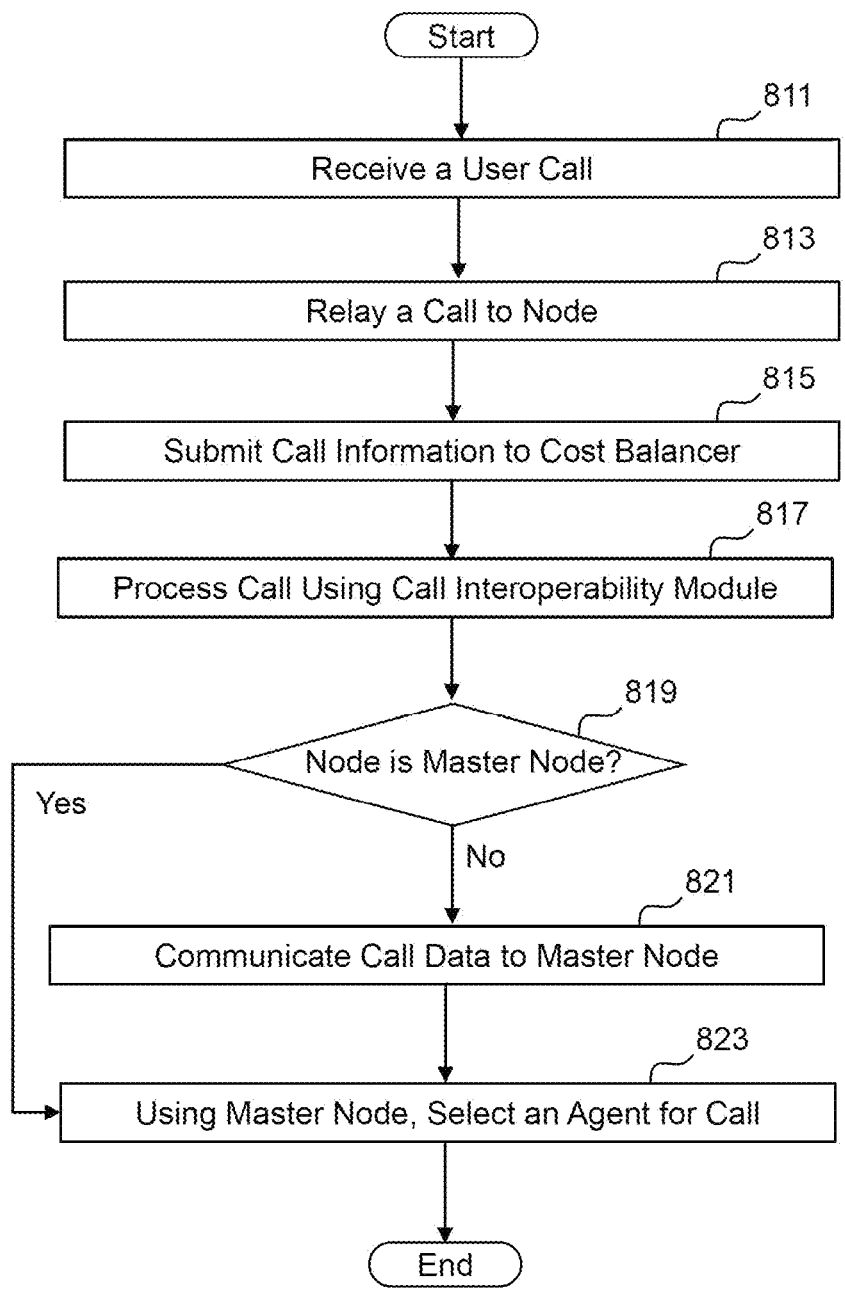
FIG. 8 is a flowchart of an example process of handling a call, consistent with disclosed embodiments.

FIG. 8 is an example flowchart of a process 801 for selecting an agent for a user call by system 101. At step 811 of process 801, call relay system 420 may receive a call from a user, and at step 813, system 420 may relay a call to a node. For example, if a call originates from the West Coast, system 420 may relay a call to node 121A, and if the call originates from the East Coast, system 420 may relay a call to node 121C. At step 815, system 420 may submit information about the call to cost balancer 414. For example, system 420 may submit to cost balancer 414 information about an origin of the call, and a type of the call (e.g., whether the call is a video/audio call originating from a human, or whether the call is from a computer-based software application).

At step 817, the call may be processed by a client interoperability module, as previously described. At step 819, process 801 may include determining if a node processing the call operates as a slave or a master. If the node operates as a master (step 819, Yes), process 801 may employ a decision point module (e.g., decision point module 1) to select an agent for handling the call at step 823. Alternatively, if the node operates as a slave (step 819, No), process 801 may communicate data related to the call to a master node at step 821. Step 821 may include steps 1-3, as shown in FIG. 7. After completion of step 821, a master node for handling the call may be configured to select the agent for the call at step 823.

As described above, assigning a master role to a node for an account may include authorizing the node for the account to make decisions for assigning agents to calls associated with the account. Further, assigning a slave role to a node for an account may include authorizing the node for the account to collect information about users placing calls to the node. In various embodiments, a node for an account may be assigned only one role being either the master or the slave. In various cases, the account may be associated with a group of users configured to place calls with the system. In an example embodiment, a slave role may be assigned to a node for a first account, and a master role may be assigned to the same node for a second account.

Further, as described before, minimizing a network cost associated with transmitting the data over the network may include assigning the master role for an account to a node located in geographical proximity to an area from which the largest number of calls is being placed. In various embodiments, the optimal assignment of a master and slave roles for a plurality of accounts being handled by the plurality of nodes may be reevaluated. In some cases, it may be reevaluated at specific times during the day, at specific time intervals, when a total cost associated with handling calls (as described before, for example, using a cost function) is above a threshold value, or when a gradient of the total cost is above a threshold value.

As previously described, a total cost associated with handling calls may be computed as a weighted average of the network cost ($C_{net}$), the processing cost ($C_{cpu}$), and the cost of dynamically reassigning the master and slave roles to the plurality of nodes in the network ($C_{switch}$). Further, the total cost may also include a cost of wear-and-tear for the hardware of a node due to traffic to the node ($C_{traffic}$), as well as various delay costs, such as a delay cost associated with a cost to a user placing a call due to a delay in assigning an agent to the call ($C_{delay}$), or an agent delay cost associated with a cost to a user placing a call due to delays associated with a response from an agent handling the call ($C_{agent\_delay}$). In some cases, the total cost may be computed as a weighted average of all or some of the above-mentioned costs.

Descriptions of the disclosed embodiments are not exhaustive and are not limited to the precise forms or embodiments disclosed. Modifications and adaptations of the embodiments will be apparent from consideration of the specification and practice of the disclosed embodiments. For example, the described implementations include hardware, firmware, and software, but systems and methods consistent with the present disclosure can be implemented as hardware alone. Additionally, the disclosed embodiments are not limited to the examples discussed herein.

Computer programs based on the written description and methods of this specification are within the skill of a software developer. The various programs or program modules can be created using a variety of programming techniques. For example, program sections or program modules can be designed in or by means of Java, C, C++, assembly language, or any such programming languages. One or more of such software sections or modules can be integrated into a computer system, non-transitory computer-readable media, or existing communications software.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods can be modified in any manner, including by reordering steps or inserting or deleting steps. It is intended, therefore, that the specification and examples be considered as illustrative only, with a true scope and spirit being indicated by the following claims and their full scope of equivalents.

What is claimed is:

1. A system for handling calls in a network, the system comprising a memory storing instructions and a processor configured to execute the instructions to perform operations comprising:

receiving information about the calls for a time interval;

determining, for the time interval, a total cost associated with handling the calls, including a network cost associated with transmitting data over the network, a processing cost for processing the information related to the calls, and a cost of dynamically reassigning master and slave roles to a plurality of nodes in the network, wherein the total cost is a weighted average of the network cost, the processing cost, and the cost of dynamically reassigning the master and slave roles to the plurality of nodes in the network;

determining an assignment of the master and slave roles for a plurality of accounts being handled by the plurality of nodes that results in the total cost having a minimum value; and implementing the optimal assignment among the plurality of the accounts based on the determination.

2. The system of claim 1, wherein the total cost is calculated based on a call volume for the calls during the time interval, geographic origins of the calls, and an assignment of the master and slave roles to the plurality of nodes.

3. The system of claim 1, wherein the calls comprise one of an audio call, a text message, a video call, or a binary data stream.

4. The system of claim 1, wherein receiving the information about calls comprises receiving information about a user, and wherein the information about the user includes at least a location at which the calls are being placed.

5. The system of claim 1, wherein receiving the information about the calls comprises at least an urgency of the calls.

6. The system of claim 1, wherein handling the calls comprises determining agents for handling the calls.

7. The system of claim 1, wherein assigning the master role to a node for an account comprises authorizing the node for the account to make decisions for assigning agents to calls associated with the account.

8. The system of claim 1, wherein assigning the slave role to a node for an account comprises authorizing the node for the account to collect information about users placing calls to the node.

9. The system of claim 7, wherein a node having the slave role for an account is configured to communicate the information about the users to a node having the master role for the account.

10. The system of claim 1, wherein a node for an account is assigned only one role being either the master or the slave.

11. The system of claim 1, wherein an account from the plurality of accounts is associated with a group of users configured to place calls with the system.

12. The system of claim 1, wherein minimizing the network cost associated with transmitting the data over the network comprises assigning the master role for an account to a node located in geographical proximity to an area from which a largest number of calls is being placed.

13. The system of claim 1, further configured to reevaluate an optimal assignment of the master and slave roles for the plurality of accounts being handled by the plurality of nodes based on the determined total cost.

14. The system of claim 1, wherein the total cost further comprises a cost of wear-and-tear for hardware of a node due to traffic to the node.

15. The system of claim 1, wherein the total cost further comprises a delay cost associated with a cost to a user placing a call due to a delay in assigning an agent to the call.

16. The system of claim 1, wherein the total cost further comprises an agent delay cost associated with a cost to a user placing a call due to a delay associated with a response from an agent handling the call.

17. A method for handling calls in a network, the method comprising:

receiving information about calls for a time interval;

determining, for the time interval, a total cost associated with handling the calls allocated to nodes for processing the calls, including a network cost associated with transmitting data over the network, a processing cost for processing information related to the calls, and a cost of dynamically reassigning master and slave roles to a plurality of nodes in the network;

determining an optimal assignment of the master and slave roles for the plurality of accounts being handled by nodes that results in the total cost having a minimum value;

calculating a gradient of the total cost due to a reallocation of the calls to different nodes;

determining whether the total cost is reduced by at least a minimum required value when the calls are reallocated;

reallocating the calls when the total cost is reduced below the minimum required value; and implementing the optimal assignment among the plurality of accounts based on the determination.

18. The method of claim 17, wherein the total cost is calculated based on a call volume for the calls during the time interval, geographic origins of the calls, and an assignment of the master and slave roles to the plurality of nodes.

19. A method for handling calls the method comprising:

initially assigning slave and master roles to a plurality of nodes in a network;

receiving the calls from users by the plurality of nodes;

processing the calls using the plurality of nodes by obtaining information for the calls;

submitting the information for the calls to a cost balancer, wherein the cost balancer is configured to perform operations comprising:

receiving information about the calls for a time interval;

determining, for the time interval, a total cost associated with handling the calls, including a network cost associated with transmitting data over the network, a processing cost for processing the information related to the calls, and a cost of dynamically reassigning the master and slave roles to the plurality of nodes in the network, wherein the total cost is a weighted average of the network cost, the processing cost, and the cost of dynamically reassigning the master and slave roles to the plurality of nodes in the network;

determining an assignment of the master and slave roles for a plurality of accounts being handled by the plurality of nodes that results in the total cost having a minimum value; and implementing the optimal assignment among the plurality of the accounts based on the determination.

20. The method of claim 19, wherein the master node is configured to assign the agent to the calls.

* * * * *